(12) United States Patent
Cortez

(10) Patent No.: US 12,306,017 B2
(45) Date of Patent: May 20, 2025

(54) MULTIPLE PLANE LEVEL ASSEMBLY

(71) Applicant: Tony A. Cortez, Wylie, TX (US)

(72) Inventor: Tony A. Cortez, Wylie, TX (US)

( * ) Notice: Subject to any disclaimer, the term of this patent is extended or adjusted under 35 U.S.C. 154(b) by 370 days.

(21) Appl. No.: 18/082,203

(22) Filed: Dec. 15, 2022

(65) Prior Publication Data

US 2024/0200941 A1    Jun. 20, 2024

(51) Int. Cl.
*G01C 9/28* (2006.01)

(52) U.S. Cl.
CPC ..................................... *G01C 9/28* (2013.01)

(58) Field of Classification Search
CPC ... G01C 9/18; G01C 9/20; G01C 9/22; G01C 9/26; G01C 9/28; G01C 9/34
USPC .......................................................... 33/381
See application file for complete search history.

(56) References Cited

U.S. PATENT DOCUMENTS

| | | | |
|---|---|---|---|
| 4,060,902 A | 12/1977 | Keller | |
| 4,168,578 A * | 9/1979 | VanderWerf | G01C 9/28 33/382 |
| 4,693,011 A * | 9/1987 | Strayham | G01B 3/566 D10/69 |
| 5,222,303 A * | 6/1993 | Jardine | G01B 3/02 33/528 |
| 5,353,509 A | 10/1994 | Black | |
| 5,535,523 A * | 7/1996 | Endris | G01B 3/566 33/DIG. 1 |
| 5,675,901 A | 10/1997 | Young | |
| 5,832,618 A * | 11/1998 | Scarborough | G01C 9/28 33/479 |
| 6,032,378 A * | 3/2000 | Null | A47G 1/205 33/645 |
| 6,502,322 B2 * | 1/2003 | Smochek | G01C 9/26 33/373 |
| 6,615,500 B2 * | 9/2003 | Hale | G01C 9/28 33/365 |
| 6,912,794 B2 * | 7/2005 | Hannah | E04G 21/1808 33/405 |
| 6,935,041 B2 | 8/2005 | Orton | |
| 6,964,111 B1 * | 11/2005 | Duffield | G01B 3/06 33/456 |
| D586,246 S | 2/2009 | Rosso | |
| 7,562,463 B2 | 7/2009 | Vaes | |
| 7,882,643 B1 * | 2/2011 | Portinen | G01B 3/04 33/474 |
| 8,011,108 B2 * | 9/2011 | Upthegrove | G01C 9/26 33/382 |
| 8,087,177 B2 * | 1/2012 | Chisholm | G01B 3/566 33/383 |
| D657,274 S | 4/2012 | Nethling | |

(Continued)

FOREIGN PATENT DOCUMENTS

WO    WO2006079204    8/2006

*Primary Examiner* — George B Bennett

(57) ABSTRACT

A multiple plane level assembly for precisely locating fence pickets on a fence includes a level that has a first member which is perpendicularly oriented with a second member. A plurality of bubble levels is each integrated into a respective one of the first member and the second member. Each of the bubble levels is respectively oriented along a horizontal axis, a vertical axis and a diagonal axis. In this way bubble levels can indicate an orientation of the first member and the second member with respect to a vertical axis, a horizontal axis and a diagonal axis to facilitate the fence pickets to be precisely oriented.

13 Claims, 6 Drawing Sheets

(56) References Cited

U.S. PATENT DOCUMENTS

| | | | |
|---|---|---|---|
| 9,032,637 B2* | 5/2015 | Propp | B25H 7/04 33/669 |
| 9,228,832 B2* | 1/2016 | Steele | H02G 1/00 |
| 10,627,231 B2* | 4/2020 | Wilkes | G01C 9/28 |
| 11,112,240 B2* | 9/2021 | Bernsen | G01V 3/165 |
| 11,692,803 B2* | 7/2023 | Jones | G01B 3/566 33/429 |
| 2004/0172839 A1* | 9/2004 | Zirk | F21V 33/0084 33/451 |
| 2006/0123646 A1* | 6/2006 | McRae | B43L 7/007 33/451 |
| 2011/0083398 A1 | 4/2011 | Manion | |
| 2015/0096182 A1* | 4/2015 | Silberberg | B23K 37/00 33/381 |
| 2015/0308820 A1* | 10/2015 | Silberberg | G01C 9/28 33/382 |
| 2017/0343347 A1* | 11/2017 | Liao | G01C 9/28 |
| 2018/0010912 A1* | 1/2018 | Captarencu | G01C 9/28 |
| 2018/0364041 A1* | 12/2018 | Rice | G01C 9/28 |
| 2021/0148704 A1* | 5/2021 | Rice | G01C 9/28 |
| 2023/0194231 A1* | 6/2023 | Escobar | G01C 9/24 33/382 |
| 2024/0240942 A1* | 7/2024 | Gretkowski | G01C 9/34 |

\* cited by examiner

MULTIPLE PLANE LEVEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to level devices and more particularly pertains to a new level device for precisely locating fence pickets on a fence. The device includes a first member that is perpendicularly oriented with a second member. The device includes a plurality of bubble levels that are each integrated into a respective one of the first member and the second member. Additionally, each of the bubble levels is oriented to extend along a respective horizontal axis, a vertical axis or a diagonal axis. In this way each of the bubble levels can facilitate fence pickets to be precisely aligned with each other and to be precisely vertically oriented when the first member is laid across the top end of the fence pickets and the second member extends downwardly between respective fence pickets. The device includes a graduated scale applied to the second member to facilitate measurements to be taken with the graduated scale.

(2) Description of Related Art Including Information Disclosed Under 37 CFR 1.97 and 1.98

The prior art relates to level devices including a combination construction tool that includes a first member slidably attached to a second member and a plurality of bubble levels integrated into a respective first member and second member. The prior art discloses a combination construction tool that includes a first member perpendicularly oriented with a second member, a plurality of bubble levels integrated into a respective first member and second member and an extension member that is attachable to the second member. The prior art discloses a variety of combination squares that each at least includes a first member and a second member that is pivotally attachable to the first member for defining a variety of angles. The prior art discloses a variety of framing squares that each at least includes a first member perpendicularly oriented with a second member and a variety of attachment elements disposed on the first member. The prior art discloses a leveling device that includes a first level that is releasably attachable to a second level at an obtuse angle.

BRIEF SUMMARY OF THE INVENTION

An embodiment of the disclosure meets the needs presented above by generally comprising a level that has a first member which is perpendicularly oriented with a second member. A plurality of bubble levels is each integrated into a respective one of the first member and the second member. Each of the bubble levels is respectively oriented along a horizontal axis, a vertical axis and a diagonal axis. In this way bubble levels can indicate an orientation of the first member and the second member with respect to a vertical axis, a horizontal axis and a diagonal axis to facilitate the fence pickets to be precisely oriented.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
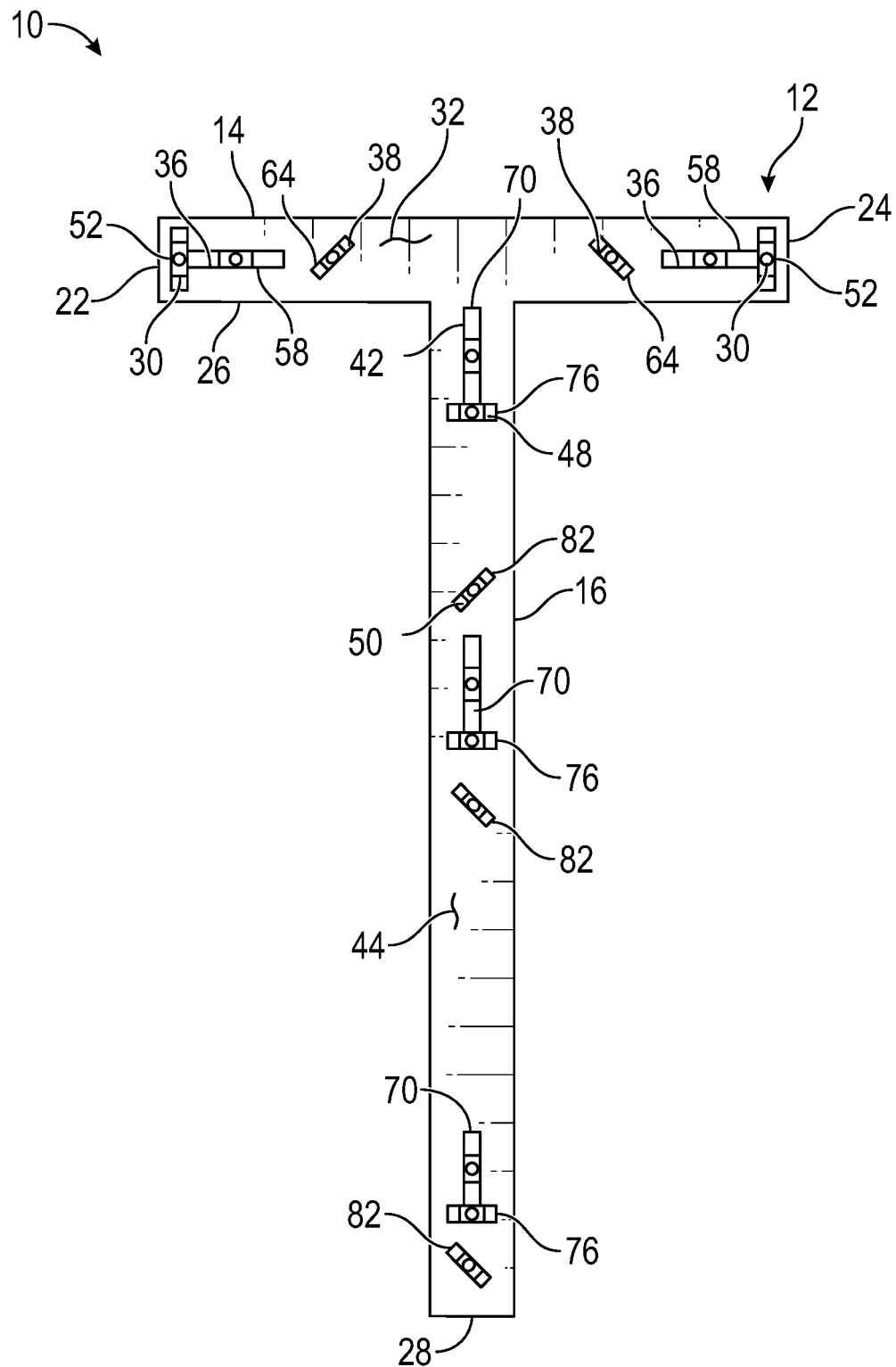
FIG. 1 is a front view of a multiple plane level assembly according to an embodiment of the disclosure.
Figure 2:
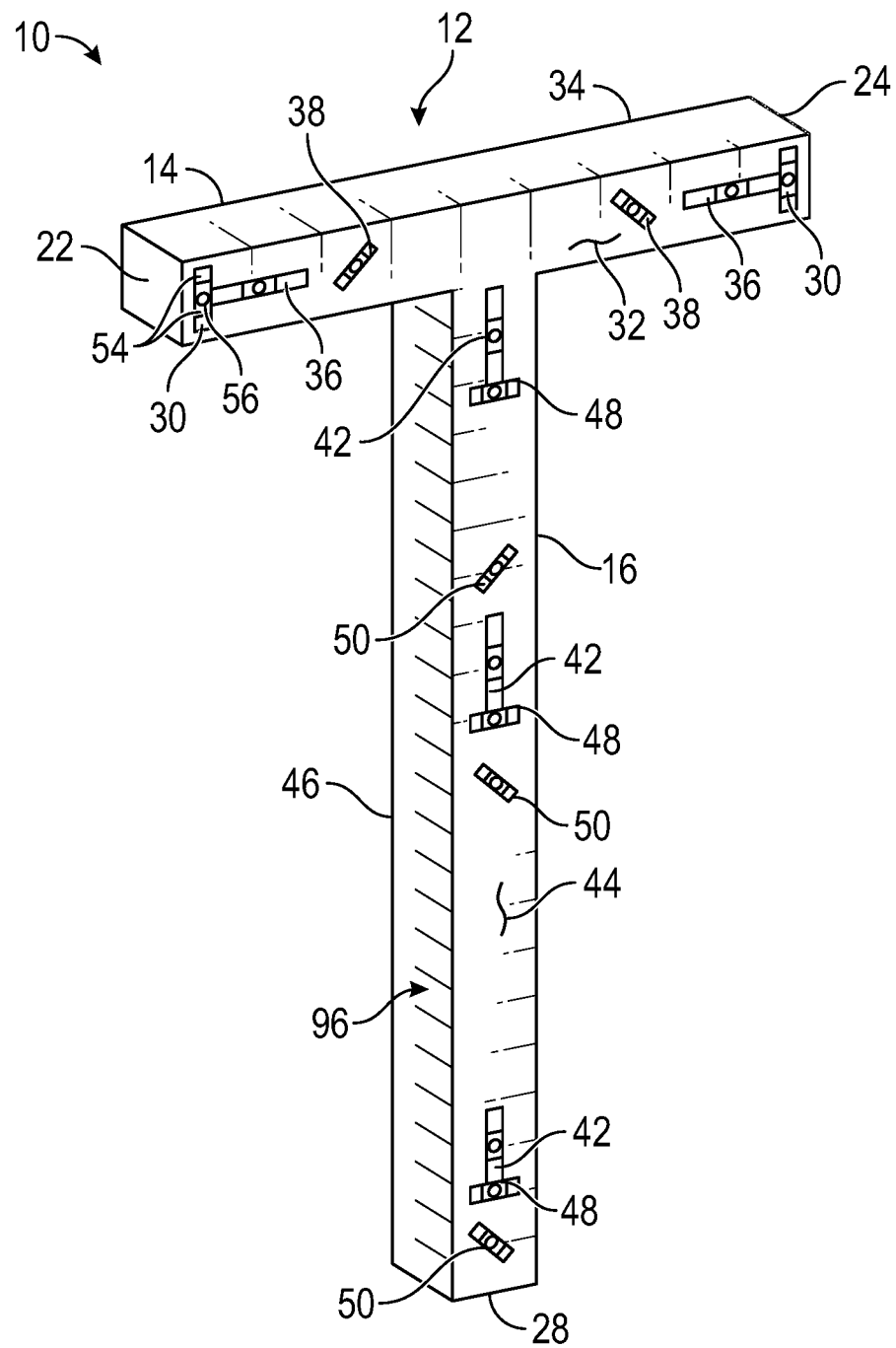
FIG. 2 is a front perspective view of an embodiment of the disclosure.
Figure 3:
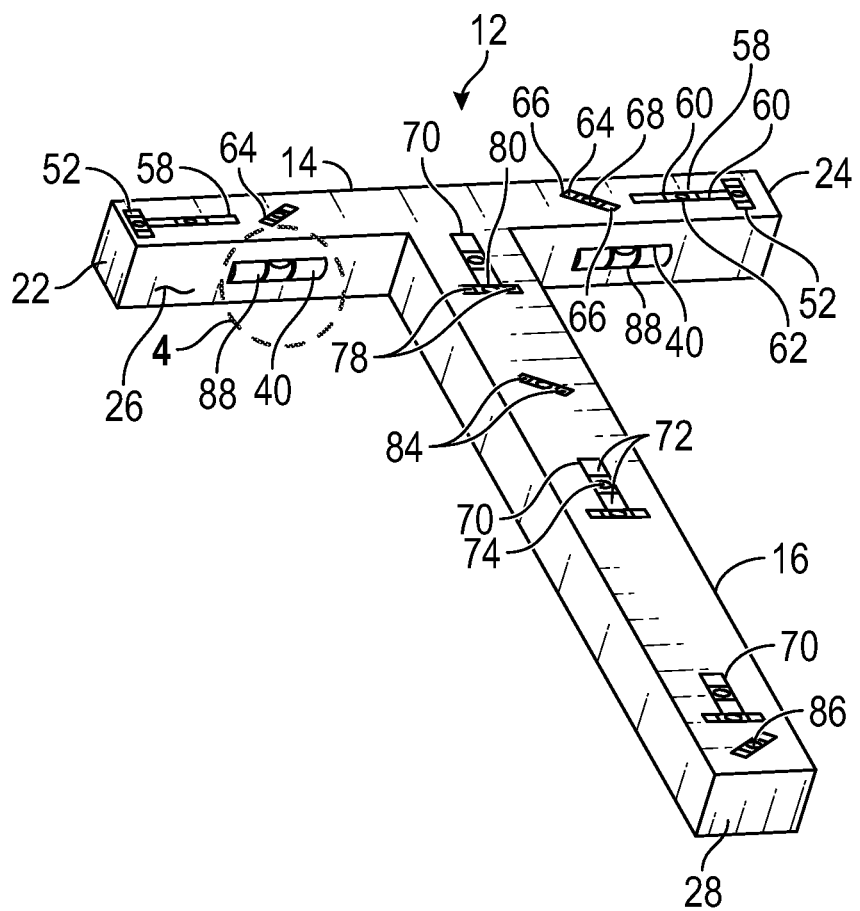
FIG. 3 is a bottom perspective view of an embodiment of the disclosure.
Figure 4:
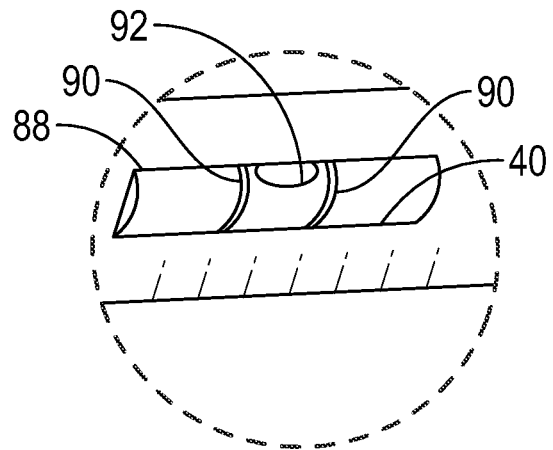
FIG. 4 is a detail view taken from circle 4 of FIG. 3 of an embodiment of the disclosure.
Figure 5:
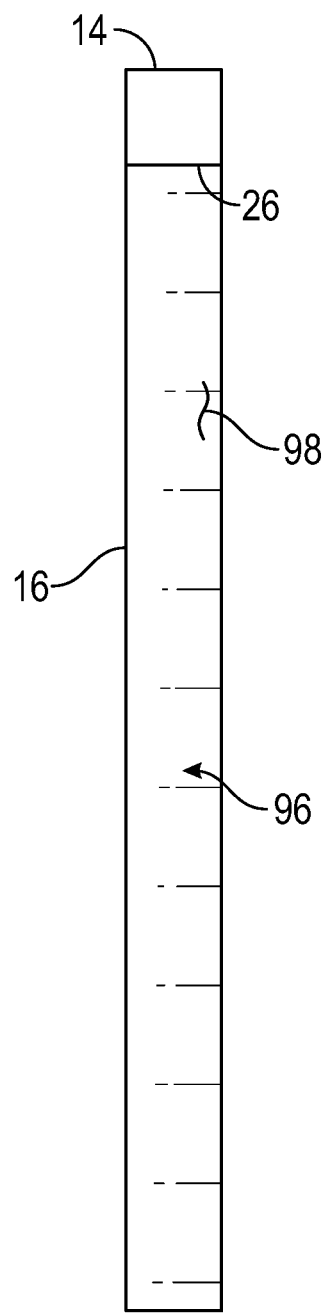
FIG. 5 is a left side view of an embodiment of the disclosure.
Figure 6:
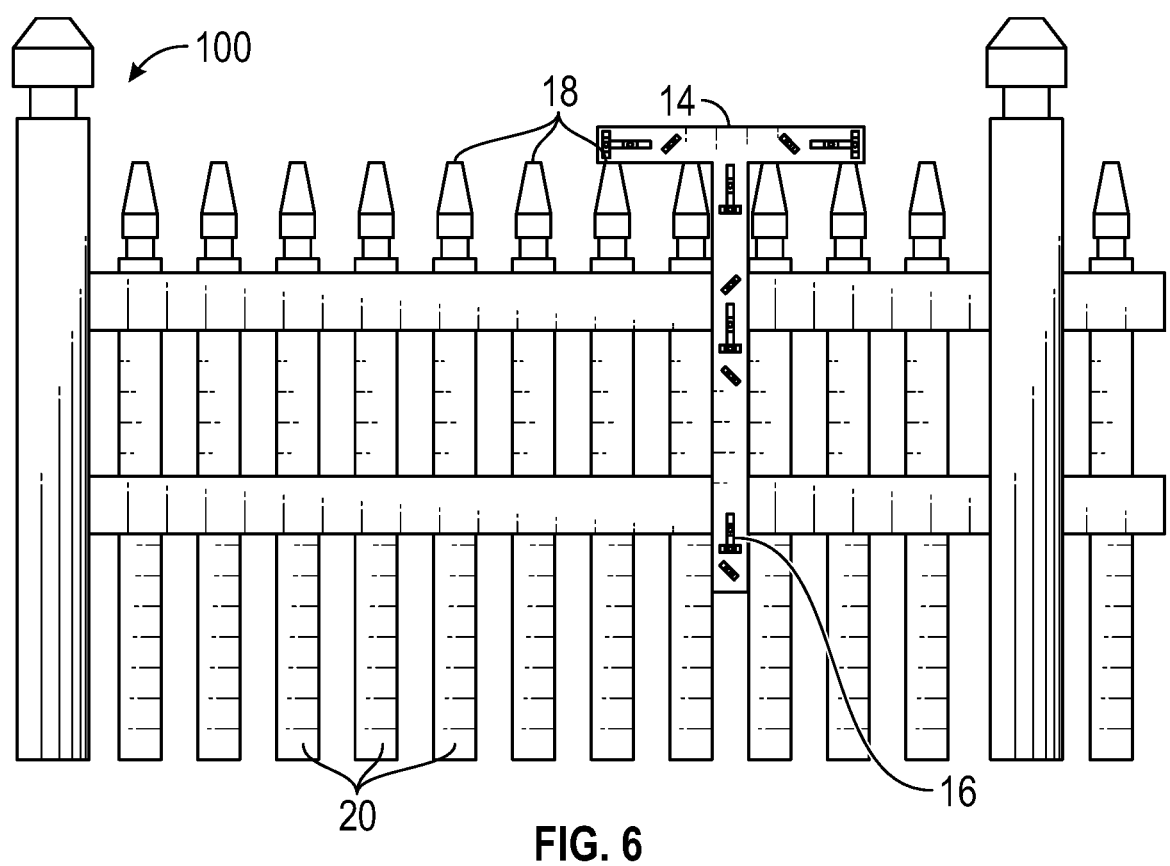
FIG. 6 is a perspective in-use view of an embodiment of the disclosure.
Figure 7:
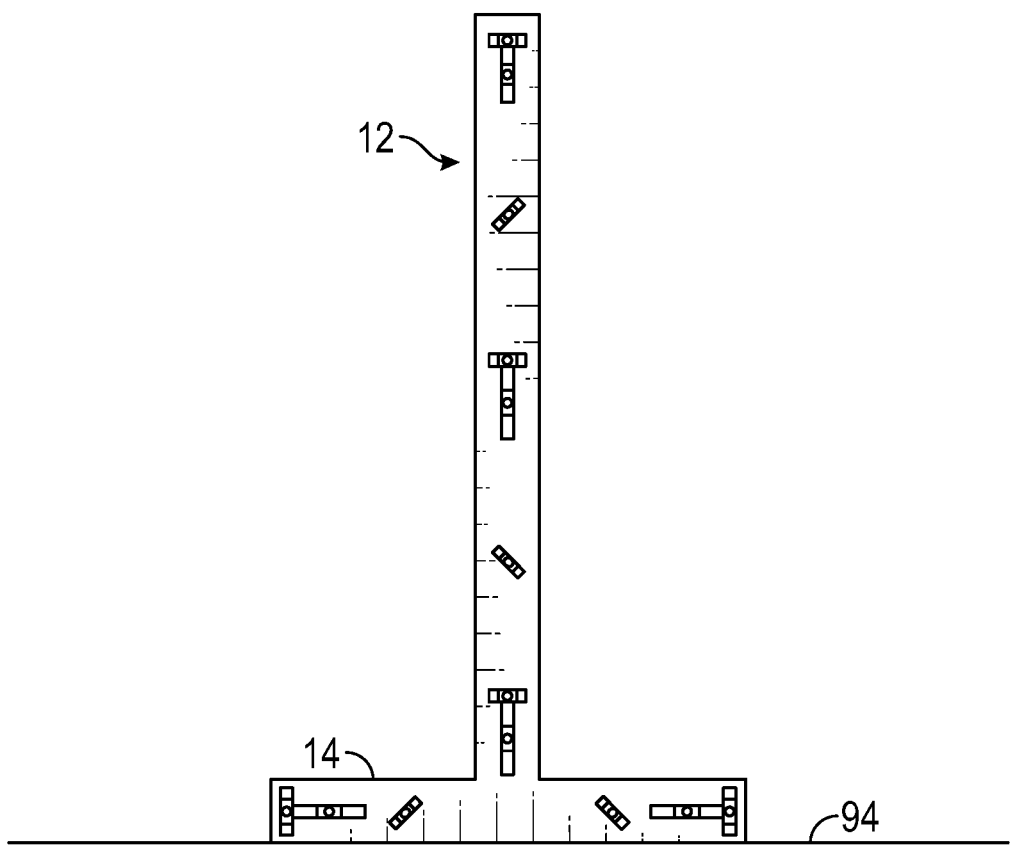
FIG. 7 is a perspective in-use view of an embodiment of the disclosure showing a first member being laid on a horizontal surface.

With reference now to the drawings, and in particular to FIGS. 1 through 7 thereof, a new level device embodying the principles and concepts of an embodiment of the disclosure and generally designated by the reference numeral 10 will be described.

As best illustrated in FIGS. 1 through 7, the multiple plane level assembly 10 generally comprises a level 12 that has a first member 14 which is perpendicularly oriented with a second member 16. The first member 14 can be positioned to extend along top ends 18 of a plurality of fence pickets 20 having the second member 16 positioned to extend downwardly along a respective one of the fence pickets 20. The first member 14 has a first end 22, a second end 24 and a bottom surface 26 extending between the first end 22 and the second end 24 and the second member 16 extends downwardly from the bottom surface 26 having the second member 16 being centrally positioned between the first end 22 and the second end 24. The second member 16 has a distal end 28 with respect to the first member 14 and the second member 16 has a length that is greater than a length of the first member 14. Furthermore, the first member 14 may have a length ranging between approximately 60.0 cm and 70.0 cm and a height of approximately 10.0 cm. The second member 16 may have a length ranging between approximately 120.0 cm and 130.0 cm and a width of approximately 10.0 cm.

The first member 14 has a pair of first slots 30 each extending through a front surface 32 and a back surface 34 of the first member 14. Each of the first slots 30 is positioned adjacent to a respective one of the first end 22 and the second end 24 and each of the first slots 30 is elongated to extend substantially along the respective first end 22 and the second end 24. The first member 14 has a pair of second slots 36 each extending through the front surface 32 and the back surface 34 and each of the second slots 36 is oriented to perpendicularly intersect a respective one of the first slots 30. Additionally, each of the second slots 36 is elongated to extend toward a center of the first member 14.

The first member 14 has a pair of third slots 38 each extending through the front surface 32 and the back surface 34 and each of the third slots 38 is spaced from a respective one of the second slots 36. Each of the third slots 38 is elongated to extend along an axis that is diagonally oriented with an axis extending between the first end 22 and the second end 24 of the first member 14. Each of the third slots 38 is oriented to angle toward the center of the first member 14 from the respective second slot 36. Each of the third slots 38 may be oriented at a 45.0 degree angle in the first member 14. The first member 14 has a pair of wells 40 that is each recessed into the bottom surface 26 of the first member 14. Each of the wells 40 is positioned between the second member 16 and a respective one of the first end 22 and the second end 24 of the first member 14. Additionally, each of the wells 40 is elongated to extend along the axis extending between the first end 22 and the second end 24.

The second member 16 has a plurality of primary slots 42 each extending through a forward surface 44 and a rear surface 46 of the second member 16. Each of the primary slots 42 is elongated to extend along an axis extending between the distal end 28 of the second member 16 and the first member 14. The primary slots 42 are spaced apart from each other and are evenly distributed between the distal end 28 of the second member 16 and the first member 14. Additionally, each of the primary slots 42 is centrally positioned on the second member 16.

The second member 16 has a plurality of secondary slots 48 each extending through the forward surface 44 and the rear surface 46 of the second member 16. Each of the secondary slots 48 is oriented to perpendicularly intersect a respective one of the primary slots 42 and each of the secondary slots 48 is positioned between the respective primary slot 42 and the distal end 28 of the second member 16. The second member 16 has a plurality of tertiary slots 50 each extending through the forward surface 44 and the rear surface 46 of the second member 16. Each of the tertiary slots 50 is elongated to extend along an axis that is diagonally oriented with the axis extending between the distal end 28 of the second member 16 and the first member 14. Additionally, each of the tertiary slots 50 may be oriented at a 45.0 degree angle on the second member 16.

A plurality of first bubble levels 52 is each integrated into the first member 14. Each of the first bubble levels 52 are oriented parallel with the second member 16 thereby facilitating the first bubble levels to indicate an orientation of the first member 14 with respect to a vertical axis. In this way the first bubble levels 52 facilitate the fence pickets 20 to be vertically oriented when the second member 16 is laid across the top of the fence pickets 20. Each of the first bubble levels 52 is positioned in a respective one of the first slots 30 in the first member 14. Additionally, each of the first bubble levels 52 has a pair of lines 54 and a bubble 56 within the first bubble levels 52 thereby facilitating the bubble 56 to be positioned between the pair of lines 54 for leveling the first member 14 along a respective fence picket 20.

A plurality of second bubble levels 58 is each integrated into the first member 14. Each of the second bubble levels 58 is oriented perpendicular with the second member 16 thereby facilitating the second bubble levels 58 to indicate an orientation of the first member 14 with respect to a horizontal axis. In this way the second bubble levels 58 facilitate the top ends 18 of the fence pickets 20 to be aligned with each other when the first member 14 is laid along the top ends 18 of the fence pickets 20. Each of the second bubble levels 58 is positioned in a respective one of the second slots 36 in the first member 14. Each of the second bubble levels 58 has a pair of lines 60 and a bubble 62 within the second bubble levels 58 thereby facilitating the bubble 62 in the second bubble levels 58 to be positioned between the pair of lines 60 on a respective second bubble level 58 for leveling the first member 14 along the horizontal axis.

A plurality of third bubble levels 64 is each integrated into the first member 14 and each of the third bubble levels 64 is diagonally oriented with the second member 16. In this way the third bubble levels 64 can indicate an orientation of the first member 14 with respect to a diagonal axis. Each of the third bubble levels 64 is positioned in a respective one of the third slots 38 in the first member 14. Each of the third bubble levels 64 has a pair of lines 66 and a bubble 68 within the third bubble levels 64 thereby facilitating the bubble 68 in the third bubble levels 64 to be positioned between the pair of lines 66 on a respective third bubble level 64 for leveling the first member 14 along the diagonal axis.

A plurality of primary bubble levels 70 is each integrated into the second member 16. Each of the primary bubble levels 70 is oriented perpendicular with the first member 14 thereby facilitating the primary bubble level 70 to indicate an orientation of the second member 16 with respect to a horizontal axis. In this way the primary bubble levels 70 facilitate the top ends 18 of the fence pickets 20 to be aligned with each other when the second member 16 is positioned to extend along the top ends 18 of the fence pickets 20. Each of the primary bubble levels 70 is positioned in a respective one of the primary slots 42 in the second member 16. Additionally, each of the primary bubble levels 70 has a pair of lines 72 and a bubble 74 within the primary bubble levels 70 thereby facilitating the bubble 74 in the primary bubble levels 70 to be positioned between the pair of lines 72 on a respective primary bubble level 12 for leveling the second member 16 along the horizontal axis.

A plurality of secondary bubble levels 76 is each integrated into the second member 16. Each of the secondary bubble levels 76 are oriented parallel with the first member 14 thereby facilitating the secondary bubble level 76 to indicate an orientation of the second member 16 with respect to a vertical axis. In this way the secondary bubble levels 76 to facilitate the fence pickets 20 to be vertically oriented. Each of the secondary bubble levels 76 is positioned in a respective one of the secondary slots 48 in the second member 16. Each of the secondary bubble levels 76 has a pair of lines 78 and a bubble 80 within the secondary bubble levels 76 thereby facilitating the bubble 80 in the secondary bubble levels 76 to be positioned between the pair of lines 78 on a respective secondary bubble level 12 for leveling the second member 16 along the vertical axis.

A plurality of tertiary bubble levels 82 is each integrated into the second member 16. Each of the tertiary bubble levels 82 is diagonally oriented with the first member 14 thereby facilitating the tertiary bubble levels 82 to indicate an orientation of the second member 16 with respect to a diagonal axis. Each of the tertiary bubble levels 82 is positioned in a respective one of the tertiary slots 50 in the second member 16. Additionally, each of the tertiary bubble levels 82 has a pair of lines 84 and a bubble 86 within the tertiary bubble levels 82. In this way the bubble 86 in the tertiary bubble levels 82 can be positioned between the pair of lines 84 on a respective tertiary bubble 82 for leveling the second member 16 along the diagonal axis.

A plurality of bottom bubble levels 88 is each positioned in a respective one of the wells 40 in the bottom surface 26 of the first member 14. Each of the bottom bubble levels 88 has a pair of lines 90 and a bubble 92 within the bottom bubble levels 88. In this way the bubble 92 in the bottom bubble levels 88 can be positioned between the pair of lines 90 on a respective bottom bubble level 88 for leveling the first member 14 along a horizontal plane when the first member 14 is laid on a horizontal surface 94.

A graduated scale 96 is applied to the second member 16 thereby facilitating measurements to be taken with the second member 16. The graduated scale 96 is positioned on a first lateral surface 98 of the second member 16. Furthermore, the graduated scale 96 extends between the distal end 28 of the second member 16 and the bottom surface 26 of the first member 14. The graduated scale 96 may comprise a construction ruler that is divided into 1/16 inch segments for measuring fence pickets 20 and other boards employed during the construction of a fence 100.

In use, the first member 14 is laid along the top ends 18 of the fence pickets 20 when the fence pickets 20 are being installed on a fence 100 thereby facilitating the fence pickets 20 to be precisely aligned with each other. Furthermore, a respective fence picket 20 can be laid against the second member 16 to ensure that the respective fence picket 20 is precisely vertically oriented. In this way the fence pickets 20 can be quickly installed in a precisely vertically oriented manner. Furthermore, the width of the second member 16 facilitates the fence pickets 20 to be evenly spaced apart from each other during the installation process. As is most clearly shown in FIG. 7, the first member 14 can be laid on the horizontal surface 94, such as a concrete slab for example, such that the bottom bubble levels 88 are visible on the first member 14 to facilitate a slope of the horizontal surface 94 to be measured.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple plane level assembly for leveling pickets in a fence along a horizontal plane and a vertical plane, said assembly comprising:

a level having a first member being perpendicularly oriented with a second member thereby facilitating said first member to be positioned to extend along top ends of a plurality of fence pickets having said second member positioned to extend downwardly along a respective one of the fence pickets;

a plurality of first bubble levels, each of said first bubble levels being integrated into said first member, each of said first bubble levels being oriented parallel with said second member thereby facilitating said first bubble levels to indicate an orientation of said first member with respect to a vertical axis wherein said first bubble levels are configured to facilitate the fence pickets to be vertically oriented when said second member is laid across the top of the fence pickets;

a plurality of second bubble levels, each of said second bubble levels being integrated into said first member, each of said second bubble levels being oriented perpendicular with said second member thereby facilitating said second bubble levels to indicate an orientation of said first member with respect to a horizontal axis wherein said second bubble levels are configured to facilitate the top ends of the fence pickets to be aligned with each other when said first member is laid along the top ends of the fence pickets;

a plurality of third bubble levels, each of said third bubble levels being integrated into said first member, each of said third bubble levels being diagonally oriented with said second member thereby facilitating said third bubble levels to indicate an orientation of said first member with respect to a diagonal axis;

a plurality of primary bubble levels, each of said primary bubble levels being integrated into said second member, each of said primary bubble levels being oriented perpendicular with said first member thereby facilitating said primary bubble levels to indicate an orientation of said second member with respect to a horizontal axis wherein said primary bubble levels are configured to facilitate the top ends of the fence pickets to be aligned with each other when said second member is positioned to extend along the top ends of the fence pickets;

a plurality of secondary bubble levels, each of said secondary bubble levels being integrated into said second member, each of said secondary bubble levels being oriented parallel with said first member thereby facilitating said secondary bubble levels to indicate an orientation of said second member with respect to a vertical axis wherein said secondary bubble levels are configured to facilitate the fence pickets to be vertically oriented; and a plurality of tertiary bubble levels, each of said tertiary bubble levels being integrated into said second member, each of said tertiary bubble levels being diagonally oriented with said first member thereby facilitating said tertiary bubble levels to indicate an orientation of said second member with respect to a diagonal axis.

2. The assembly according to claim 1, wherein:

said first member has a first end, a second end and a bottom surface extending between said first end and said second end, said second member extending downwardly from said bottom surface having said second member being centrally positioned between said first end and said second end, said second member having a distal end with respect to said first member, said second member having a length being greater than a length of said first member;

said first member has a pair of first slots each extending through a front surface and a back surface of said first member, each of said first slots being positioned adjacent to a respective one of said first end and said second end, each of said first slots being elongated to extend substantially along said respective first end and said second end;

said first member has a pair of second slots each extending through said front surface and said back surface, each of said second slots being oriented to perpendicularly intersect a respective one of said first slots, each of said second slots being elongated to extend toward a center of said first member; and said first member has a pair of third slots each extending through said front surface and said back surface, each of said third slots being spaced from a respective one of said second slots, each of said third slots being elongated to extend along an axis being diagonally oriented with an axis extending between said first end and said second end of said first member, each of said third slots being oriented to angle toward said center of said first member from said respective second slot.

3. The assembly according to claim 1, wherein:

said second member has a plurality of primary slots each extending through a forward surface and a rear surface of said second member, each of said primary slots being elongated to extend along an axis extending between said distal end of said second member and said first member, said primary slots being spaced apart from each other and being evenly distributed between said distal end of said second member and said first member, each of said primary slots being centrally positioned on said second member;

said second member has a plurality of secondary slots each extending through said forward surface and said rear surface of said second member, each of said secondary slots being oriented to perpendicularly intersect a respective one of said primary slots, each of said secondary slots being positioned between said respective primary slot and said distal end of said second member; and said second member has a plurality of tertiary slots each extending through said forward surface and said rear surface of said second member, each of said tertiary slots being elongated to extend along an axis being diagonally oriented with said axis extending between said distal end of said second member and said first member.

4. The assembly according to claim 2, wherein each of said first bubble levels is positioned in a respective one of said first slots in said first member, each of said first bubble levels having a pair of lines and a bubble within said first bubble levels thereby facilitating said bubble to be positioned between said pair of lines for leveling said first member along a respective fence picket.

5. The assembly according to claim 2, wherein each of said second bubble levels is positioned in a respective one of said second slots in said first member, each of said second bubble levels having a pair of lines and a bubble within said second bubble levels thereby facilitating said bubble in said second bubble levels to be positioned between said pair of lines on a respective second bubble for leveling said first member along said horizontal axis.

6. The assembly according to claim 2, wherein each of said third bubble levels is positioned in a respective one of said third slots in said first member, each of said third bubble levels having a pair of lines and a bubble within said third bubble levels thereby facilitating said bubble in said third bubble levels to be positioned between said pair of lines on a respective third bubble for leveling said first member along said diagonal axis.

7. The assembly according to claim 3, wherein each of said primary bubble levels is positioned in a respective one of said primary slots in said second member, each of said primary bubble levels having a pair of lines and a bubble within said primary bubble levels thereby facilitating said bubble in said primary bubble levels to be positioned between said pair of lines on a respective primary bubble level for leveling said second member along said horizontal axis.

8. The assembly according to claim 3, wherein each of said secondary bubble levels is positioned in a respective one of said secondary slots in said second member, each of said secondary bubble levels having a pair of lines and a bubble within said secondary bubble levels thereby facilitating said bubble in said secondary bubble levels to be positioned between said pair of lines on a respective secondary bubble level for leveling said second member along said vertical axis.

9. The assembly according to claim 3, wherein each of said tertiary bubble levels is positioned in a respective one of said tertiary slots in said second member, each of said tertiary bubble levels having a pair of lines and a bubble within said tertiary bubble levels thereby facilitating said bubble in said tertiary bubble levels to be positioned between said pair of lines on a respective tertiary bubble for leveling said second member along said diagonal axis.

10. The assembly according to claim 2, wherein said first member having a pair of wells each being recessed into said bottom surface of said first member, each of said wells being positioned between said second member and a respective one of said first end and said second end of said first member, each of said wells being elongated to extend along said axis extending between said first end and said second end.

11. The assembly according to claim 10, further comprising a plurality of bottom bubble levels, each of said bottom bubble levels being positioned in a respective one of said wells in said bottom surface of said first member, each of said bottom bubble levels having a pair of lines and a bubble within said bottom bubble levels thereby facilitating said bubble in said bottom bubble levels to be positioned between said pair of lines on a respective bottom bubble for leveling said first member along a horizontal plane when said first member is laid on a horizontal surface.

12. The assembly according to claim 2, further comprising a graduated scale being applied to said second member thereby facilitating measurements to be taken with said second member, said graduated scale being positioned on a first lateral surface of said second member, said graduated scale extending between said distal end of said second member and said bottom surface of said first member.

13. A multiple plane level assembly for leveling pickets in a fence along a horizontal plane and a vertical plane, said assembly comprising:

a level having a first member being perpendicularly oriented with a second member thereby facilitating said first member to be positioned to extend along top ends of a plurality of fence pickets having said second member positioned to extend downwardly along a respective one of the fence pickets, said first member having a first end, a second end and a bottom surface extending between said first end and said second end, said second member extending downwardly from said bottom surface having said second member being centrally positioned between said first end and said second end, said second member having a distal end with respect to said first member, said second member having a length being greater than a length of said first member, said first member having a pair of first slots each extending through a front surface and a back surface of said first member, each of said first slots being positioned adjacent to a respective one of said first end and said second end, each of said first slots being elongated to extend substantially along said respective first end and said second end, said first member having a pair of second slots each extending through said front surface and said back surface, each of said second slots being oriented to perpendicularly intersect a respective one of said first slots, each of said second slots being elongated to extend toward a center of said first member, said first member having a pair of third slots each extending through said front surface and said back surface, each of said third slots being spaced from a respective one of said second slots, each of said third slots being elongated to extend along an axis being diagonally oriented with an axis extending between said first end and said second end of said first member, each of said third slots being oriented to angle toward said center of said first member from said respective second slot, said first member having a pair of wells each being recessed into said bottom surface of said first member, each of said wells being positioned between said second member and a respective one of said first end and said second end of said first member, each of said wells being elongated to extend along said axis extending between said first end and said second end, said second member having a plurality of primary slots each extending through a forward surface and a rear surface of said second member, each of said primary slots being elongated to extend along an axis extending between said distal end of said second member and said first member, said primary slots being spaced apart from each other and being evenly distributed between said distal end of said second member and said first member, each of said primary slots being centrally positioned on said second member, said second member having a plurality of secondary slots each extending through said forward surface and said rear surface of said second member, each of said secondary slots being oriented to perpendicularly intersect a respective one of said primary slots, each of said secondary slots being positioned between said respective primary slot and said distal end of said second member, said second member having a plurality of tertiary slots each extending through said forward surface and said rear surface of said second member, each of said tertiary slots being elongated to extend along an axis being diagonally oriented with said axis extending between said distal end of said second member and said first member;

a plurality of first bubble levels, each of said first bubble levels being integrated into said first member, each of said first bubble levels being oriented parallel with said second member thereby facilitating said first bubble levels to indicate an orientation of said first member with respect to a vertical axis wherein said first bubble levels are configured to facilitate the fence pickets to be vertically oriented when said second member is laid across the top of the fence pickets, each of said first bubble levels being positioned in a respective one of said first slots in said first member, each of said first bubble levels having a pair of lines and a bubble within said first bubble levels thereby facilitating said bubble to be positioned between said pair of lines for leveling said first member along a respective fence picket;

a plurality of second bubble levels, each of said second bubble levels being integrated into said first member, each of said second bubble levels being oriented perpendicular with said second member thereby facilitating said second bubble levels to indicate an orientation of said first member with respect to a horizontal axis wherein said second bubble levels are configured to facilitate the top ends of the fence pickets to be aligned with each other when said first member is laid along the top ends of the fence pickets, each of said second bubble levels being positioned in a respective one of said second slots in said first member, each of said second bubble levels having a pair of lines and a bubble within said second bubble levels thereby facilitating said bubble in said second bubble levels to be positioned between said pair of lines on a respective second bubble for leveling said first member along said horizontal axis;

a plurality of third bubble levels, each of said third bubble levels being integrated into said first member, each of said third bubble levels being diagonally oriented with said second member thereby facilitating said third bubble levels to indicate an orientation of said first member with respect to a diagonal axis, each of said third bubble levels being positioned in a respective one of said third slots in said first member, each of said third bubble levels having a pair of lines and a bubble within said third bubble levels thereby facilitating said bubble in said third bubble levels to be positioned between said pair of lines on a respective third bubble for leveling said first member along said diagonal axis;

a plurality of primary bubble levels, each of said primary bubble levels being integrated into said second member, each of said primary bubble levels being oriented perpendicular with said first member thereby facilitating said primary bubble levels to indicate an orientation of said second member with respect to a horizontal axis wherein said primary bubble levels are configured to facilitate the top ends of the fence pickets to be aligned with each other when said second member is positioned to extend along the top ends of the fence pickets, each of said primary bubble levels being positioned in a respective one of said primary slots in said second member, each of said primary bubble levels having a pair of lines and a bubble within said primary bubble levels thereby facilitating said bubble in said primary bubble levels to be positioned between said pair of lines on a respective primary bubble level for leveling said second member along said horizontal axis;

a plurality of secondary bubble levels, each of said secondary bubble levels being integrated into said second member, each of said secondary bubble levels being oriented parallel with said first member thereby facilitating said secondary bubble levels to indicate an orientation of said second member with respect to a vertical axis wherein said secondary bubble levels are configured to facilitate the fence pickets to be vertically oriented, each of said secondary bubble levels being positioned in a respective one of said secondary slots in said second member, each of said secondary bubble levels having a pair of lines and a bubble within said secondary bubble levels thereby facilitating said bubble in said secondary bubble levels to be positioned between said pair of lines on a respective secondary bubble level for leveling said second member along said vertical axis; and a plurality of tertiary bubble levels, each of said tertiary bubble levels being integrated into said second member, each of said tertiary bubble levels being diagonally oriented with said first member thereby facilitating said tertiary bubble levels to indicate an orientation of said second member with respect to a diagonal axis, each of said tertiary bubble levels being positioned in a respective one of said tertiary slots in said second member, each of said tertiary bubble levels having a pair of lines and a bubble within said tertiary bubble levels thereby facilitating said bubble in said tertiary bubble levels to be positioned between said pair of lines on a respective tertiary bubble for leveling said second member along said diagonal axis;

a plurality of bottom bubble levels, each of said bottom bubble levels being positioned in a respective one of said wells in said bottom surface of said first member, each of said bottom bubble levels having a pair of lines and a bubble within said bottom bubble levels thereby facilitating said bubble in said bottom bubble levels to be positioned between said pair of lines on a respective bottom bubble for leveling said first member along a horizontal plane when said first member is laid on a horizontal surface; and a graduated scale being applied to said second member thereby facilitating measurements to be taken with said second member, said graduated scale being positioned on a first lateral surface of said second member, said graduated scale extending between said distal end of said second member and said bottom surface of said first member.

\* \* \* \* \*